(12) United States Patent
Weston et al.

(10) Patent No.: US 12,497,529 B2
(45) Date of Patent: Dec. 16, 2025

(54) ADDITIVE MANUFACTURING TECHNIQUES AND INK FORMULATIONS FOR INCORPORATING ADSORBENT PARTICLES

(71) Applicants: ExxonMobil Technology and Engineering Company, Annandale, NJ (US); GEORGIA TECH RESEARCH CORPORATION, Atlanta, GA (US)

(72) Inventors: Simon C. Weston, Annandale, NJ (US); Ryan P. Lively, Atlanta, GA (US); Carter W. Abney, Athens, WI (US); Fengyi Zhang, Bartlesville, OK (US); William J. Koros, Atlanta, GA (US); Wenying Quan, Marietta, GA (US); Stephen J.A. DeWitt, Boston, MA (US); Matthew J. Realff, Atlanta, GA (US); Hannah E. Holmes, Atlanta, GA (US); Yang Liu, Belmont, MA (US)

(73) Assignees: ExxonMobil Technology and Engineering Company, Annandale, NJ (US); Georgia Tech Research Corporation, Atlanta, GA (US)

(*) Notice: Subject to any disclaimer, the term of this patent is extended or adjusted under 35 U.S.C. 154(b) by 751 days.

(21) Appl. No.: 17/749,714

(22) Filed: May 20, 2022

(65) Prior Publication Data

US 2022/0372314 A1 Nov. 24, 2022

Related U.S. Application Data

(60) Provisional application No. 63/195,310, filed on Jun. 1, 2021, provisional application No. 63/191,640, filed on May 21, 2021, provisional application No. 63/191,715, filed on May 21, 2021.

(51) Int. Cl.
| | | |
|---|---|---|
| *C09D 11/36* | (2014.01) | |
| *B01J 20/20* | (2006.01) | |
| *B01J 20/22* | (2006.01) | |
| *B01J 20/28* | (2006.01) | |
| *B29C 64/112* | (2017.01) | |
| *B29C 64/124* | (2017.01) | |
| *B33Y 70/00* | (2020.01) | |
| *B29K 105/00* | (2006.01) | |
| *B33Y 10/00* | (2015.01) | |

(52) U.S. Cl.
CPC .............. *C09D 11/36* (2013.01); *B01J 20/20* (2013.01); *B01J 20/226* (2013.01); *B01J 20/28042* (2013.01); *B01J 20/28052* (2013.01); *B29C 64/112* (2017.08); *B29C 64/124* (2017.08); *B33Y 70/00* (2014.12); *B29K 2105/0073* (2013.01); *B29K 2995/0068* (2013.01); *B33Y 10/00* (2014.12)

(58) Field of Classification Search
CPC ......... C09D 11/36; B01J 20/20; B01J 20/226; B01J 20/28042; B01J 20/28052; B33Y 70/00; B29C 64/124; B29C 64/112
See application file for complete search history.

(56) References Cited

U.S. PATENT DOCUMENTS

| | | | |
|---|---|---|---|
| 2012/0152117 A1* | 6/2012 | Lively | ................. B01J 20/226 95/139 |
| 2018/0169617 A1 | 6/2018 | Brody et al. | |
| 2018/0272268 A1* | 9/2018 | Nguyen | ................. B01J 13/14 |
| 2018/0289853 A1 | 10/2018 | Yahiaoui et al. | |
| 2019/0083954 A1 | 3/2019 | Rezael et al. | |
| 2019/0217517 A1 | 7/2019 | Erikson et al. | |
| 2019/0256528 A1 | 8/2019 | Corella Ochoa et al. | |
| 2021/0004034 A1 | 1/2021 | Zhu et al. | |
| 2021/0053024 A1 | 2/2021 | Minguez et al. | |

OTHER PUBLICATIONS

Dhainaut et al., ACS Appl. Mater. Interfaces, (2020), v.12, p. 10983-10992.*
Dhainaut et al., ACS Appl. Mater. Interfaces, (2020), v.12, p. 10983-10992. (Provided before).*
International Search Report and Written Opinion in related PCT Application No. PCT/US22/30276, mailed Aug. 16, 2022.
International Preliminary Report on Patentability in related PCT Application No. PCT/US22/30276, mailed Nov. 21, 2023.
Kosuri, M. R. et al., "Defect-Free Asymmetric Hollow Fiber Membranes from Torlon®, a Polyamide-Imide Polymer, for High Pressure CO2 Separations" Journal of Membrane Science, vol. 320, Issues 1-2, Jul. 15, 2008, pp. 65-72.
Extended European Search Report for European Patent Application No. 22805586.9 mailed Sep. 19, 2025.

(Continued)

*Primary Examiner* — Yong L Chu
(74) *Attorney, Agent, or Firm* — Troutman Pepper Locke LLP; John Morrissett; Scott A. Bergeson

(57) ABSTRACT

Ink compositions are provided for using solvent-based additive manufacturing (SBAM) techniques to form contactor structures and/or structures for use in an adsorption or absorption contactor. Methods forming a contactor using SBAM are also provided. The ink compositions can include a substantial content of adsorbent particles to provide enhanced adsorption by a contactor. Metal organic framework (MOF) structures and zeotype framework structures are examples of types of adsorbent particles that can be incorporated into an ink composition for forming a contactor structure by SBAM. The ink can further include a polymeric component that can serve as the structural component of a polymeric structural material produced by the additive manufacturing method. Such a structural material can correspond to a polymeric material with incorporated adsorbent particles. In some aspects, the polymeric structural material and/or the adsorbent particles can have selectivity for adsorption of $CO_2$ from a process fluid flow.

24 Claims, 2 Drawing Sheets

(56) References Cited

OTHER PUBLICATIONS

Lawson et al., "Binderless Zeolite Monoliths Production with Sacrificial Biopolymers," Chemical Engineering Journal, vol. 407, Elsevier, Dec. 8, 2020.

Thakkar et al., "Development of 3D-Printed Polymer-Zeolite Composite Monoliths for Gas Separation," Chemical Engineering Journal, vol. 348, Sep. 1, 2018, pp. 109-116.

* cited by examiner

ADDITIVE MANUFACTURING TECHNIQUES AND INK FORMULATIONS FOR INCORPORATING ADSORBENT PARTICLES

CROSS-REFERENCE TO RELATED APPLICATIONS

This application is a non-provisional of, and claims priority under 35 U.S.C. § 119 to, U.S. Provisional Patent Application No. 63/195,310, filed on Jun. 1, 2021, entitled "Additive Manufacturing Techniques And Ink Formulations For Incorporating Adsorbent Particles,"; U.S. Provisional Patent Application No. 63/191,715, filed on May 21, 2021, entitled "Polymeric Sorbent Hollow Fiber Compositions Incorporating Metal Organic Frameworks,"; and U.S. Provisional Patent Application No. 63/191,640, filed on May 21, 2021, entitled "Advantaged Adsorption Contactors," the entire contents of each of which are fully incorporated herein by reference.

FIELD

Ink formulations and corresponding additive manufacturing techniques are provided for forming adsorption contactor structures based on structural materials corresponding to polymeric materials that incorporate adsorbent particles.

BACKGROUND

Mitigation of $CO_2$ emissions from various types of $CO_2$ sources (both industrial and small-scale) is an area of ongoing interest. One type of strategy for mitigation of $CO_2$ emissions is to use an adsorbent or absorbent to remove $CO_2$ from a potential emission gas flow, and then desorb the $CO_2$ as part of a stream that can be processed to reduce, minimize, or eliminate the release of $CO_2$ into the atmosphere.

Although a variety of materials are known that can adsorb or absorb $CO_2$, implementing such adsorbents/absorbents in an effective contactor structure remains a challenge. Some of the difficulties in designing contactor structures are related to limitations in the types of contactor designs that can be implemented using conventional materials. Traditional contactor designs have typically incorporated the adsorbents/absorbents as part of a packed bed or a monolith. Packed bed structures can be effective for incorporating a large quantity of adsorbent/absorbent into a volume. The particles in the packed bed can correspond to sorbent particles, mixtures of sorbent particles with binders or diluents, or particles made from a support material where the sorbent is deposited on the support. However, packed beds typically result in large pressure drops relative to the volume of fluid flow passing through the packed bed, making it difficult to scale packed bed adsorbers to large volumes for applications such as $CO_2$ capture. Metal or ceramic monoliths can provide an alternative to packed beds, and can provide flow channels that mitigate difficulties with pressure drop. However, the density of adsorbent sites that can be introduced on a metal or ceramic monolith is often limited to the surfaces of channels. Additionally, managing temperature within a monolith can pose a separate set of challenges. In particular, cooling of monolith structures typically requires introducing a heat transfer fluid into the interior of the monolith. Due to difficulties in machining complex structures in ceramic or metal monoliths after formation, it can be difficult to provide target amounts of heat transfer fluid to the interior of a monolith structure while still reducing or minimizing the risk of mixing of the heat transfer fluid with the process fluid flows.

What is needed are systems and methods for forming at least portions of contactor structures so that the density of sorbent sites in a contactor structure can be improved relative to conventional monoliths while reducing or minimizing the fluid flow limitations that accompany packed bed adsorbers. Preferably, the resulting contactor structures can be suitable for processing large volumes of fluid flow, such as the types of volumes that may be needed for $CO_2$ removal from industrial scale combustion exhaust flows.

U.S. Patent Application Publication 2021/0040343 describes methods for using ternary ink compositions including a polymer, a solvent, and a non-solvent for solvent based additive manufacturing. During three-dimensional printing, after depositing a layer of ink, the polymeric structure is formed by phase inversion after evaporation of a portion of the solvent from the ink.

An article titled "Defect-Free Asymmetric Hollow Fiber Membranes from Torlon®, a Polyamide-Imide Polymer, for High Pressure $CO_2$ Separations" (Kosuri, M. R., Koros, W. I, Journal of Membrane Science, 2008, 320, 65) describes determining the binodal line of a ternary phase diagram via the cloud-point method.

SUMMARY

In various aspects, an ink composition for solvent based additive manufacturing is provided. The ink composition includes 2.0 wt % or more of an adsorbent material relative to a weight of an ink composition. The ink composition further includes 35 wt % or less of a polymer. The ink composition further includes a solvent for the polymer. The ink composition further includes a structure forming component for the polymer, a ratio of the weight of the polymer to a combined weight of the solvent and the structure forming component being 0.7 or less.

In some aspects, the ink composition can include one or more of: 10 wt % or more of the adsorbent material; a ratio of the weight of the adsorbent to a weight of the polymer of 1.0 or more; 15 wt % or less of the polymer; and/or a ratio of the weight of the polymer to the combined weight of the solvent and the structure forming component of 0.20 or less.

In some aspects, such an ink composition can be used to form a 3D printed polymer structure by printing such an ink composition, and then evaporating a portion of the solvent to form a continuous polymer structure. In some aspects, a continuous polymer structure formed by such 3D printing is provided.

DETAILED DESCRIPTION

Figure 1:
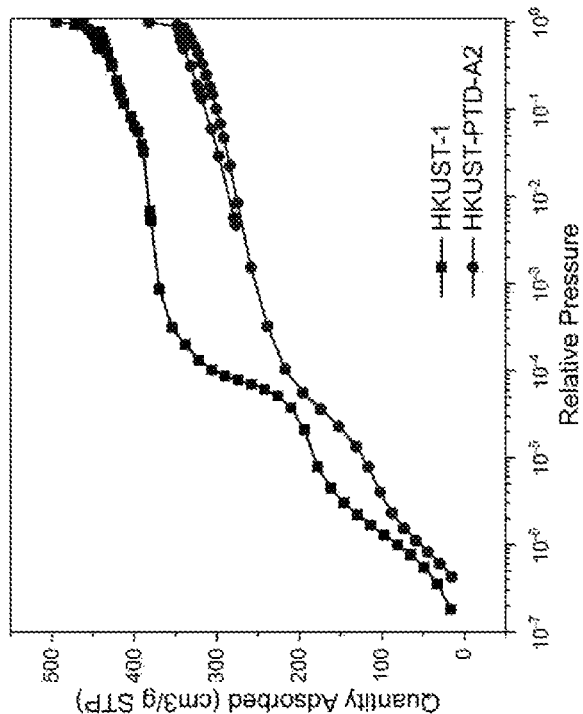
FIG. 1 shows nitrogen physisorption isotherms obtained for a MOF adsorbent and filaments formed by 3D printing that incorporate the MOF adsorbent.

All numerical values within the detailed description and the claims herein are modified by "about" or "approximately" the indicated value, and take into account experimental error and variations that would be expected by a person having ordinary skill in the art.

Overview

In various aspects, ink compositions are provided for using solvent-based additive manufacturing (SBAM) techniques to form contactor structures and/or structures for use in an adsorption or absorption contactor. Methods forming a contactor using SBAM are also provided. The ink compositions can include a substantial content of adsorbent particles to provide enhanced adsorption of a component (such as $CO_2$) by a contactor. Metal organic framework (MOF) structures and zeotype framework structures are examples of types of adsorbent particles that can be incorporated into an ink composition for forming a contactor structure by SBAM. The ink can further include a polymeric component that can serve as the structural component of a polymeric structural material produced by the additive manufacturing method. Such a structural material can correspond to a polymeric material with incorporated adsorbent particles. In some aspects, the polymeric structural material and/or the adsorbent particles can have selectivity for adsorption of $CO_2$ from a process fluid flow. In some aspects, the polymeric structural material and/or the adsorbent particles can have selectivity for adsorption of a gas phase component from a gas phase flow containing light gases.

Solvent-based additive manufacturing (SBAM) is a method for forming a structure via three-dimensional (3D) printing. In SBAM, a structure is formed by printing a target shape using an ink that includes at least a solvent, a polymer component, and an additional component, where the ink can form the structural material as the solvent is evaporated. The amounts of solvent, polymer, and additional component in the ink composition can be selected based on a phase diagram, so that evaporation of a target amount of the solvent results in formation of a continuous polymer phase. This additional component is referred to herein as a "structure forming component". In some aspects, the additional component (i.e., the structure forming component) can be a non-solvent in the ink composition. In some aspects, it has been discovered that a pore-forming component (alternatively referred to as a pore former) can be used in addition to and/or in place of the non-solvent as a structure forming component. It is noted that temperature induced phase separation is a type of SBAM process.

It has been discovered that addition of adsorbent particles in substantial quantities to potential ink compositions results in substantial changes in the rheology of the ink composition. This is due in part to the fact that the adsorbent particles become dispersed in the ink. As a result, the ink composition corresponds to a suspension, as opposed to being a solution of polymer in solvent and an additional component. In various aspects, ink compositions including substantial quantities of particles are provided that have suitable rheology for performing SBAM to form contactors and/or portions of contactor structures. In various aspects, the ink compositions can correspond to a mixture of a solvent, a polymer component, adsorbent particles, and a structure formation component. The structure formation component can correspond to a non-solvent, a pore forming component, or a combination thereof.

Some types of adsorbent materials, such as MOFs and materials having a zeotype framework structure, can have relatively high surface areas, which contributes to the effectiveness of such materials for adsorption applications. When adsorbent materials are incorporated into a polymeric structure using SBAM methods, it has been discovered that the resulting polymeric structures have a lower surface area than would be expected based on the proportions of the polymer material and adsorbent material in the polymeric structural material used to form the structures. Although the surface areas and pore volumes are lower than expected, it has been further unexpectedly discovered that the adsorption capacity of the adsorbent materials can be substantially retained.

Using SBAM methods to form polymeric structural materials that incorporate adsorbents can provide various advantages over conventional methods for incorporating adsorbents into contactor structures. Using SBAM can allow for manufacturing of structures with internal features that are difficult to otherwise achieve in a ceramic or metal monolith. For example, straight channels can be added to a solid body monolith, but introducing a feature such as a header structure or a channels with multiple angular bends can be significantly more difficult. Manufacturing techniques involving forming ceramic or metal around a mold that will then be removed can also be used, but this can pose significant reliability issues when used for making the small feature sizes typically desired in an adsorption contactor. Additionally, some structures, such as triply periodic minimum surface materials, cannot be formed by injection molding techniques. By contrast, many types of features can be directly formed using SBAM to form a structure out of a polymeric structural material in a layer-by-layer manner.

Figure 3:
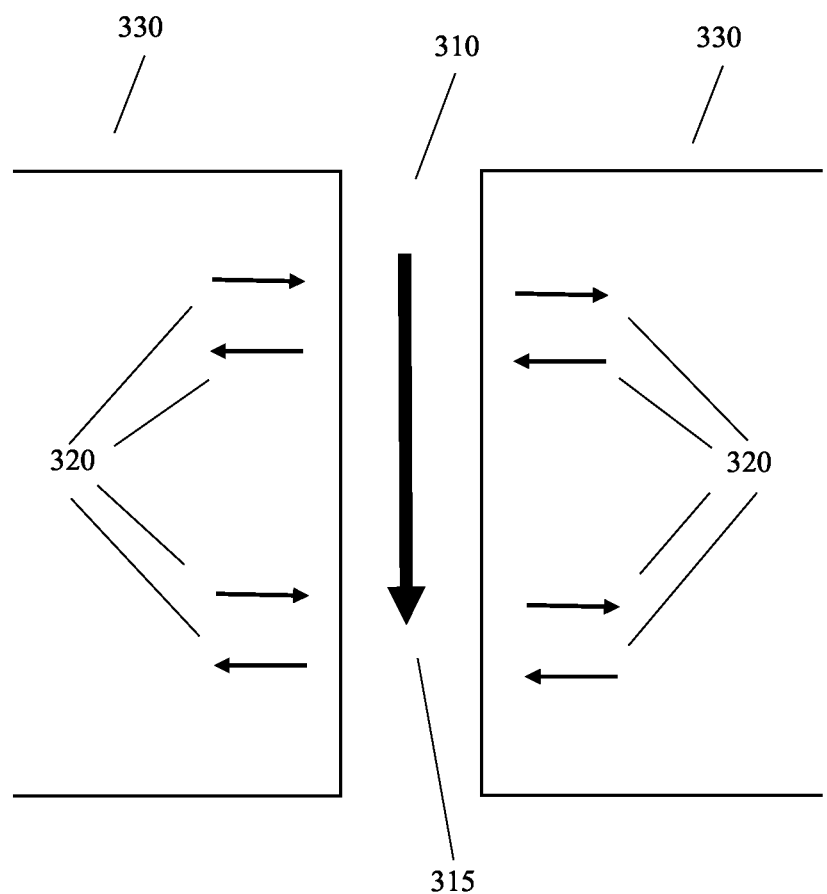
FIG. 3 illustrates an example of diffusion from a flow channel in a contactor structure into a porous structural material that defines the flow channel.

In addition to allowing for greater design flexibility in terms of contactor features, using SBAM to form a contactor and/or structures for a contactor can also increase the volume of the contactor that contributes to adsorption. In particular, in various aspects, an adsorbent (such as a MOF, zeolite, or other zeotype material) can be incorporated into the ink formulation used for the SBAM manufacturing process. This means that the adsorbent can be distributed throughout the volume of the structural material used to form the contactor. Based on the polymer selected for the polymeric backbone, the ink composition, and/or based on the conditions for forming the polymeric structure, a polymer structure can be formed that has sufficient pore volume and/or tortuous channels to allow fluids within the contactor structure to access the adsorbent material in portions of the contactor structure beyond the flow channels. FIG. 3 illustrates an example of this. In FIG. 3, channel 310 corresponds to a channel in the contactor structure Channel 310 is defined by the structural material 330 that surrounds channel 310. In the example shown in FIG. 3, arrow 315 shows the direction of flow within the channel 310. Arrows 320 show diffusion of fluid in the flow channel into the structural material 330. This diffusion indicated by arrows 320 corresponds to both diffusion into the structural material and from the structural material back into channel 310. By forming a porous polymeric structure, process fluids passed through the flow channels of a porous polymeric structure can diffuse into the pores of the polymeric structure, allowing a greater percentage of the volume of the polymeric structure to participate in an adsorption/desorption cycle. This can allow adsorption to occur in an increased percentage of the volume of the contactor, potentially corresponding to substantially all of the contactor volume that is not dedicated to managing the transport of heat transfer fluid(s). This is in contrast to the situation with conventional monoliths, where the adsorbent capacity of the monolith corresponds to adsorbent sites on the surfaces of the flow channels. Although a conventional monolith may have some porosity, because adsorbents are typically added to such monoliths using methods such as washcoating, there is only a limited ability to increase the volume of the monolith that provides adsorption sites that can be accessed by a process fluid.

Relative to a packed bed adsorbent, the ability to form contactor structures with adsorption sites distributed throughout the volume of the structural material can allow contactors manufactured (at least in part) using SBAM to have the benefit of an increased volume of accessible adsorption sites, similar to a packed bed. However, because dedicated flow channels are also provided, the fluid flow difficulties associated with packed beds, such as large pressure drop or undesired "channeling" of flow, can be reduced or minimized.

In various aspects, incorporating adsorbents into polymeric structural materials to form adsorbent contactors using ink compositions as described herein can also provide advantages relative to structures formed using other types of additive manufacturing. In various aspects, the ink compositions correspond to solutions and/or suspensions of polymeric materials, so that the curing steps needed to form a ceramic composition is not required. The resulting polymeric structures can be formed during manufacturing by allowing a portion of the ink to evaporate, which directly results in formation of a polymeric layer. This is in contrast to manufacturing methods where a subsequent photo-developing step is needed to form a structure.

Ink Compositions

In various aspects, an ink composition for forming a polymeric contactor structure that includes adsorbent particles can include at least at least one solvent, at least one structure formation component (corresponding to a non-solvent and/or a pore forming component), a polymeric material dissolved in the solvent, and particles of an adsorbent material dispersed and/or suspended in the solution.

In various aspects, polymeric ink compositions including substantial quantities of adsorbent materials can be used to form structures based on a polymeric structural material using 3D printing. The polymeric structures are formed by depositing the polymer as a solution in a combination of a solvent and at least one structure formation component, and then using solvent evaporation to drive phase inversion and form the polymeric structure. It has been discovered that the resulting polymeric structures have a lower surface area than would be expected based on the proportions of the polymer material and adsorbent material in the polymeric structural material used to form the structures. Although the surface areas and pore volumes are lower than expected, the adsorption capacity of the adsorbent materials can be substantially retained.

When performing 3D printing using an ink composition without additional adsorbent particles, based on the ternary phase diagram, an ink composition can be selected so that the ink composition corresponds to a homogenous phase, but a targeted amount of solvent evaporation can cause the ink composition to cross the binodal line, resulting in phase inversion. In some aspects, during 3D printing, the ink can be deposited in the presence of an atmosphere containing the solvent, so that solvent evaporation is reduced or minimized until after the ink composition is "printed" on the desired surface. For example, the printing head for depositing the ink can include one or more additional nozzles for dispersing additional solvent as printing occurs, so that the phase inversion does not occur until the ink is deposited on the surface. After deposition or printing of a layer of the ink composition, the solvent can be allowed to evaporate. Optionally, heating of the surface where the ink is deposited can be used to facilitate evaporation of the solvent. As the solvent concentration is reduced, the solvent system will eventually become unstable, causing the polymer dissolved in the solvent to precipitate to form a continuous polymer skeleton. The structure forming component(s) and any remaining solvent form a separate phase that can facilitate forming additional pore volume in the polymer structure. The structure forming component(s) and remaining solvent can then be removed by further drying as convenient during the manufacturing process.

When performing solvent based additive manufacturing (SBAM) using a ternary ink composition without the addition of MOF particles, the composition for the ink can be selected based on the ternary phase diagram for the polymer, solvent, and non-solvent. In particular, for ink compositions suitable for three-dimensional (3D) printing, the phase diagram for the polymer, solvent, and non-solvent will include a binodal line that separates a homogenous (solution) region from a non-homogenous region where the polymer forms a separate phase from the solvent and non-solvent. This binodal line in the ternary phase diagram can be determined by any convenient method, such as by using a "cloud-point" method. For example, at a fixed concentration of polymer, a series of compositions can be formed with successively lower ratios of solvent to non-solvent to determine the composition (or compositions) having a "cloudy" appearance due to the onset of separation into separate polymer and solvent/non-solvent phases. This process can be repeated at a series of polymer concentrations, solvent/non-solvent ratios, or combinations thereof to determine the binodal line. Another example of a method for determining a binodal line is provided in Kosuri et al. (Kosuri, M. R. Koros, W. I, Journal of Membrane Science, 2008, 320, 65).

Instead of using a conventional ink composition, it has been discovered that 3D printing can be performed using ink compositions that include a substantial portion of an adsorbent in addition to containing polymer, solvent, and structure forming component (non-solvent or polymer). In various aspects, ink compositions are provided that include a weight ratio of adsorbent particles to polymer of 0.7 or more, or 1.0 or more (i.e., a 1 to 1 weight ratio of adsorbent to polymer), or 1.5 or more, or 2.0 or more, or 3.0 or more, such as up to 6.0 or possibly still higher. Additionally or alternately, the ink composition can contain 10 wt % or more of adsorbent relative to a weight of the ink composition, or 15 wt % or more, or 20 wt % or more, such as up to 50 wt % or possibly still higher. Further additionally or alternately, a combined weight of the polymer and the adsorbent in the ink composition can correspond to 25 wt % or more of the weight of the ink composition, or 30 wt % or more, or 40 wt % or more, such as up to 60 wt % or possibly still higher. Still further additionally or alternately, the ink composition can include 7.0 wt % to 15 wt % of polymer relative to a weight of the ink composition, or 10 wt % to 15 wt %, or 12 wt % to 15 wt %. It is noted that the ink composition can include a sufficient amount of polymer so that phase inversion can occur.

More generally, an ink composition can contain 2.0 wt % or more of adsorbent relative to a weight of the ink composition, or 5.0 wt % or more, or 10 wt % or more, or 15 wt % or more, or 20 wt % or more, such as up to 50 wt % or possibly still higher. More generally, an ink composition can include 7.0 wt % to 35 wt % of polymer relative to a weight of the ink composition, or 10 wt % to 35 wt %, or 12 wt % to 35 wt %, or 7.0 wt % to 15 wt %, or 10 wt % to 15 wt %, or 12 wt % to 15 wt %.

In some aspects where a non-solvent is included in the ink composition, the ink composition can have a relatively low ratio of polymer to non-solvent. Conventionally, it is typically desirable for the polymer content of a ternary ink composition to be comparable to the non-solvent content. For example, conventional ink compositions (that do not contain suspended adsorbent particles) can have a weight ratio of polymer to non-solvent of 0.5 (i.e., 1:2) or higher, or 0.7 or higher, or 1.0 or higher, or 1.5 or higher, such as up to 20 or possibly still higher. By contrast, in some aspects the ink compositions described herein can have weight ratios of polymer to non-solvent of less than 0.50, or 0.40 or less, or 0.35 or less, or 0.30 or less, such as down to 0.10 or possibly still lower. In other aspects, the weight ratio of polymer to non-solvent can be 0.8 or less, or 0.5 or less, or 0.40 or less, or 0.35 or less, or 0.30 or less, such as down to 0.10 or possibly still lower.

Additionally or alternately, in some aspects where a non-solvent is used, the ink composition can have a relatively low weight ratio of polymer to the combined weight of solvent and non-solvent. Conventionally, for ink compositions that do not include suspended adsorbent particles, weight ratios of polymer to combined solvent plus non-solvent can be 0.25 or higher, or 0.3 or higher, such as up to 1.0 or possibly still higher. By contrast, in some aspects the ink compositions described herein can have weight ratios of polymer to combined solvent plus non-solvent of 0.20 or less, or 0.17 or less, or 0.14 or less, such as down to 0.08 or possibly still lower. In other aspects, the weight ratio of polymer to combined weight of solvent plus non-solvent can be 0.70 or less, or 0.50 or less, or 0.40 or less, or 0.30 or less, or 0.20 or less, or 0.17 or less, or 0.14 or less, such as down to 0.08 or possibly still lower.

In some alternative aspects, broader ranges of adsorbent material can be incorporated into an ink composition. For example, in some aspects, an ink composition can include a weight ratio of adsorbent to polymer of 0.3 to 6.0, or 0.5 to 6.0, or 1.0 to 6.0, or 1.5 to 6.0, or 2.0 to 6.0, or 3.0 to 6.0. At lower ratios of adsorbent material to polymer, the benefit of incorporating the adsorbent material is reduced, but the difference between such an ink composition and a conventional ternary ink composition is also reduced. In such aspects, the ink composition can contain 3.0 wt % or more of adsorbent relative to a weight of the ink composition, or 5.0 wt % or more, or 10 wt % or more, or 15 wt % or more, or 20 wt % or more, such as up to 50 wt % or possibly still higher.

A variety of adsorbent materials can be incorporated into an ink composition for forming structures via 3D printing. Some examples can correspond to metal organic framework (MOF) materials. Other examples of materials can correspond to zeotype framework materials (including materials with framework atoms different from silicon and aluminum). Sill other examples can include, but are not limited to, activated carbon, porous aromatic framework materials, covalent organic framework materials, porous organic polymers, and cage materials. More generally, any type of adsorbent that can be formulated as particles can be used in an ink composition as described herein, so long as the adsorbent particles are stable in the solvent and during formation of structures from the ink composition. The adsorbent particles can have an average size of between 0.1 µm to 50 µm. The size of an adsorbent particle is defined herein as the diameter of the smallest bounding sphere that can contain the particle.

Metal organic frameworks (MOFs) are a relatively new class of porous materials that are comprised of metal ion/oxide secondary building units interconnected by organic linking ligands through covalent bonds. MOFs are characterized by low densities, high internal surface areas, and uniformly sized pores and channels. MOFs are typically crystalline materials. Some types of MOF materials can include zeolitic imidazole frameworks (sometimes referred to as "ZIFs"), unconventional MOFs (sometimes referred to as UMOFs), and SIFSIX MOFs.

A variety of MOFs have been characterized as having $CO_2$ adsorption capabilities. For example, Mg-MOF-74 corresponds to a metal organic framework material based on $Mg^{2+}$ ions and 2,5-dihydroxyterephthalic acid. As another example, MOF-274 corresponds to a metal organic framework material based on $Mg^{2+}$ metal ions coordinated with 4,4'-dioxidobiphenyl-3,3'-dicarboxylate. As another example, EMM-67 corresponds to a metal organic framework material based on $Mg^{2+}$ and $Mn^{2+}$ metal ions coordinated with 4,4'-dioxidobiphenyl-3,3'-dicarboxylate. MOF-274 and EMM-67 can be further enhanced by appending functionalities like, diamines, N,N'-dimethylethylenediamine, or 2-aminomethylpiperidine to produce structures such as EMM-44. As still another example, MIL-101(Cr) is a metal organic framework composed of trigonal nodes of 3 chromium and at least 13 oxygen atoms that are bridged by benzene-dicarboxylate linkages in the MTN (IZA code) topology. Yet another example is EMM-42. EMM-42 is a metal organic framework having the same secondary building units as MIL-101(Cr), namely trigonal nodes of 3 chromium atoms, in which some or all of the benzene-dicarboxylate ligands joining adjacent chromium nodes have been exchanged by phenylene-bisphosphonic acid linking ligands. Still another example is HKUST-1, also referred to as MOF-99. The HKUST-1 framework is built up of dimeric metal units, which are connected by benzene-1, 3,5-tricarboxylate linker molecules. The paddlewheel unit is the commonly used structural motif to describe the coordination environment of the metal centers and also called secondary building unit (SBU) of the HKUST-1 structure. The paddlewheel is built up of four benzene-1,3,5-tricarboxylate linkers molecules, which bridge two metal centers.

In this discussion, a zeotype is defined to refer to a crystalline material having a porous framework structure built from tetrahedra atoms connected by bridging oxygen atoms. Examples of known zeotype frameworks are given in the "Atlas of Zeolite Frameworks" published on behalf of the Structure Commission of the International Zeolite Association", 6$^{th}$ revised edition, Ch. Baerlocher, L. B. McCusker, D. H. Olson, eds., Elsevier, New York (2007) and the corresponding web site, http://www.iza-structure.org/databases/. A zeolite refers to a type of zeotype that includes an aluminosilicate having a zeotype framework type, while zeotypes more generally also refer to crystalline structures having zeotype frameworks that may also containing oxides of heteroatoms different from silicon and aluminum. Such heteroatoms can include any heteroatom generally known to be suitable for inclusion in a zeotype framework, such as gallium, boron, germanium, phosphorus, zinc, and/or other transition metals that can substitute for silicon and/or aluminum in a zeotype framework. It is noted that under this definition, a zeotype can include materials such as silicoaluminophosphate (SAPO) materials, silicophosphate (SiPO) materials, or aluminophosphate (AlPO) materials.

In order to form a polymeric structure during 3D printing, the ink composition can also contain a polymer. Some examples of polymers that can be included in the ink composition are polymers of intrinsic microporosity. Polymers of Intrinsic Microporosity (PIMs) are an emerging material of interest for important gas separations. Spiro centers integrated into the polymer backbone prevent efficient packing and induce microporosity in the polymer. This microporosity can be beneficial for forming contactor structures, as the microporosity can allow process gases flowing through flow channels in a contactor structure to access other portions of the contactor volume.

Other types of porous polymers can also be used to form an ink composition. In some aspects, the polymer in an ink composition can include, but is not limited to, cellulose acetate, polyimines (such as Matrimid 5218), polyamide-imides (such as Torlon®), polyether sulfone (PES), derivatives of PIM-1 (such as amidoximated PIM-1), and other polymers with intrinsic steric frustration which effect microporosity.

In some aspects, the solvent can correspond to tetrahydrofuran, acetone, and/or N-methyl pyrrolidone. More generally, the solvent can be a solvent that has high solubility for the polymer in the ink composition. There exist many methods for determining level of solubility of the polymer in the volatile solvent compound. For example, in some aspects, the Hildebrand solubility parameters can be determined for the polymer and the volatile solvent compound. In some embodiments, the Hildebrand solubility parameters of the polymer and the volatile solvent compound can have a difference of 3.6 $MPa^{1/2}$ or less. As would be appreciated by one of ordinary skill in the art, such an embodiment would provide a volatile solvent compound which would be able to dissolve the polymer to create a substantially homogeneous solution. Depending on the aspect, potential solvents can include, but are not limited to, acetaldehyde, acetic acid, acetone, acetonitrile, butanediol, butoxyethanol, diethylenetriamine, dimethyl acetamide (DMAc), dimethylformamide (DMF), dimethyl sulfoxide (DMSO), dioxane, ethanol, ethylamine, ethylene glycol, formic acid, furfuryl alcohol, glycerol, methanol, methyl diethanolamine, N-methyl-2-pyrrolidone (NMP), propanol, propanediol, propanoic acid, propylene glycol, pyridine, tetrahydrofuran (THF), triethylene glycol, hydrogen peroxide, nitric acid, sulfuric acid, pentane, cyclopentane, hexane, cyclohexane, benzene, toluene, chloroform, diethyl ether, dichloromethane, or a combination thereof.

In aspects where a non-solvent is included in the ink composition as a structure forming component, the non-solvent can be a compound that has low or minimal solubility for the polymer in the ink composition. There exist many methods for determining level of solubility of the polymer in the nonsolvent compound. In some aspects, the non-solvent can be selected by first determining the Hansen solubility parameters for the polymer and the non-solvent compound. For example, a polymer and non-solvent can be selected so that the Relative Energy Difference calculated from the Hansen solubility parameters of the polymer and the nonsolvent compound can be 1 or greater. As would be appreciated by one of ordinary skill in the art, such an embodiment would provide a non-solvent compound which would be unable to dissolve the polymer.

In some aspects, the non-solvent can correspond to toluene, dimethyl acetamide, or combinations thereof. In some aspects, the non-solvent can be N-methyl-2-pyrrolidone (NMP). In some aspects, the non-solvent can correspond to water and/or can include water. In other aspects, the non-solvent can be substantially free of water (less than 0.1 wt %), which can allow a water-sensitive MOF to be used in the ink composition. HKUST-1 is an example of a water-sensitive MOF. In some aspects, the non-solvent can be an alcohol, such as methanol, ethanol, isopropanol, or n-propanol. In some aspects, the non-solvent can correspond to a mixture of non-solvents. In some aspects, a mixture of non-solvent and a pore forming component can be added to an ink composition. It is noted that the evaporation rate for the solvent can be faster than the evaporation rate for the non-solvent under the conditions that will be present after depositing the ink composition, as otherwise the phase inversion to form the polymer structure may not occur.

Additionally or alternately, a pore forming component can be included as a structure forming component. $LiNO_3$ is an example of a pore forming component that can be used in an ink composition. Polyvinyl pyrrolidone (PVP) is another example of a pore forming component. A pore forming component can be added in a relatively low amount, such as in an amount corresponding to 0.1 wt % to 20 wt % of an ink composition, or 0.1 wt % to 10 wt %, or 0.1 wt % to 5.0 wt %, or 1.0 wt % to 20 wt %, or 1.0 wt % to 10 wt %.

Table 1 shows examples of combinations of polymer, solvent, and either non-solvent or pore forming component (i.e., a structure forming component) that can be used to form an ink composition for solvent-based additive manufacturing. The final column of Table 1 shows certain solvents which may present difficulties when used in combination with the listed polymer to form an ink composition for solvent-based additive manufacturing (SBAM). It is noted that $LiNO_3$ is included in the "Non-Solvent" column of Table 1, but actually corresponds to a pore forming component.

TABLE 1

Polymer, Solvent, and Non-Solvent Combinations

| Polymer | Solvent | Non-Solvent (or pore former) | Solvents which may not be suitable for SBAM |
| --- | --- | --- | --- |
| PIM-1 | THF, $CH_2Cl_2$, $CHCl_3$ | DMAc, DMF, DMSO, water, methanol, ethanol, ethyl acetate, acetonitrile, toluene | NMP (hot) |
| Cellulose Acetate | Acetone | Water, Butanol, n-Propanol, isopropanol, ethanol, methanol, acetonitrile, ethyl acetate, toluene | N-Alkylpyridinium halogenides (e.g. N-ethylpyridinium chloride); Oxides of tertiary amines (e.g. trimethylamine-N-oxide, N-methylpiperidine-N-oxide, etc.); DMSO-containing systems; polar aprotic solvents (DMAc, NMP) with LiCl; Pyridine or quinolone-containing systems |

TABLE 1-continued

Polymer, Solvent, and Non-Solvent Combinations

| Polymer | Solvent | Non-Solvent (or pore former) | Solvents which may not be suitable for SBAM |
|---|---|---|---|
| Polyether sulfone | DMAc, DMF | Isopropyl Myristate; 1,2,4-trichlorobenzene; o-Dichlorobenzene; water; LiNO$_3$, PVP | NMP, DMSO |
| Matrimid | DMAc, DMF, THF, CH$_2$Cl$_2$, CHCl$_3$ | Water, alcohols, ethyl acetate, toluene, LiNO$_3$, PVP | NMP |

An example of a printer for forming structures using an ink composition can be a direct ink writing printer. For example, in some aspects, the printer can comprise an ink holding container, an ink nozzle configured to attach to the ink holding container, a vapor nozzle, and a moving stage for a substrate. In some aspects, the moving stage can be configured to detachably attach to a substrate. The distance between the ink nozzle and the moving stage can comprise an air gap substantially surrounded by a control volume shell. For instance, the control volume shell can comprise a cylindrical shell with an opening for receiving a vapor nozzle. The control volume shell can comprise any hollow shape to substantially surround the ink nozzle and air gap, including but not limited to, cylindrical, conical, rectangular, frusto-conical, elliptical, or any combination thereof. In some optional aspects, during formation of a layer, additional solvent can be dispensed as a vapor into the control volume shell to assist with managing the amount of evaporation immediately after deposition of a layer of an ink composition.

In some aspects, the bed or surface where the ink composition is deposited to form a 3D structure can correspond to a heated bed or surface. Using a heated bed or surface can assist with evaporation of the solvent in order to trigger the phase inversion that results in the polymeric structure. In some aspects, the bed or surface where an ink composition is deposited for forming a 3D printed structure can be heated to a temperature of 40° C. to 80° C.

Properties of Polymer Structures Generated by 3D Printing

A polymer structure generated by 3D printing of an ink composition as described herein can have an unexpectedly low surface area based on nitrogen adsorption isotherms. The polymer structures generated by 3D printing correspond to particles of adsorbent supported, dispersed, and/or otherwise incorporated throughout a continuous polymer structure. Conventionally, it would be expected that the surface area of such a combination of adsorbent and polymer would correspond to roughly a weighted average of the two components. However, it has been discovered that the surface area of the resulting polymer structure can be lower than the conventional expected value by at least 5.0% (relative to the expected value), or at least 8.0%, or at least 10%, such as down to having a surface area for the polymer structure that is lower than the expected value by 30% or possibly still lower.

Additionally or alternately, a polymer structure generated by 3D printing of an ink composition as described herein can have a reduced pore volume. Conventionally, it would be expected that the pore volume of such a combination of adsorbent and polymer would correspond to a weighted average of the two components. However, it has been discovered that the pore volume of the resulting polymer structure can be lower than the conventional expected value by at least 5.0% (relative to the expected value), or at least 8.0%, or at least 10%, such as down to having a pore volume for the polymer structure that is lower than the expected value by 30% or possibly still lower.

In this discussion, surface area and pore volume for a polymeric structural material formed by SBAM can be determined by determining N$_2$ adsorption isotherms according to ASTM D3663 (BET surface area) and ASTM D4641 (N$_2$ pore volume), respectively. Where specified, pore volumes can also be determined according to ASTM D4284 (Hg porosimetry for pore volume).

In some aspects, a polymeric structural material (including the incorporated adsorbent) can have a surface area of 50 m$^2$/g or more, or 100 m$^2$/g or more, or 200 m$^2$/g or more, or 500 m$^2$/g or more, such as up to 3000 m$^2$/g or possibly still higher. It is noted that such surface areas and/or pore volumes include surface area and pore volume contributions from both the polymer and the MOF. In some aspects, a polymeric structure can have a pore volume (determined by nitrogen physisorption) of 0.5 cm$^3$/g to 1.3 cm$^3$/g and/or a pore volume (determined by mercury porosimetry) of 1.0 cm$^3$/g to 3.0 cm$^3$/g.

Incorporation of Diamine-Appended Adsorbents into 3D Printed Structures

Certain MOFs, such as MOF-274 or EMM-67, when appended with diamines, will display advantaged type-V CO$_2$ isotherms. This can enable near-ideal working capacities with only minor temperature swing and thereby can provide an advantage over the type-I isotherms displayed by most adsorbents.

In some situations, immersion of diamine-appended MOFs in certain solvents can result in the removal of the diamine from an amine appended MOF. Due to the nature of the 3D printing process, MOFs incorporated into an ink composition can be exposed to multiple solvents, which can lead to removal of at least a portion and possibly substantially all of any amines appended to the MOFs. The removal of diamines from MOF adsorbents incorporated into a polymeric structural material during 3D printing can be reduced, minimized, and/or mitigated in various manners. In some aspects, the solvent and non-solvent for the ink composition can be selected to reduce or minimize removal of appended diamines. Examples of ink compositions that can reduce or minimize such stripping of appended diamines can include solvent/non-solvent pairs that include hexane, cyclohexane, and/or toluene. Additionally or alternately, after forming a structure from a polymeric structural material, a vapor phase process can be used to append additional diamines to MOF adsorbents incorporated in the polymeric structural material.

In some aspects, the appended diamine of a diamine-appended MOF (such as EMM-44) can be substantially retained in a polymeric structural materials formed by 3D printing based on selection of components in the ink composition. In particular, an ink composition can be formed that includes a diamine-appended MOF along with a) a solvent/non-solvent combination orb) a combination of a polymer, solvent, non-solvent, that can reduce or minimize loss of appended diamines during the printing process. More generally, solvents and non-solvents can be selected from nonpolar, aprotic solvents (such as hexane, toluene, and/or cyclohexane) or polar, aprotic solvents devoid of Lewis basic lone-pairs capable of donating to Lewis acid metal sites (such as tetrahydrofuran and/or dimethyl sulfoxide). Solvents that may have a greater tendency to cause removal of appended diamines can include nitrogen-containing polar aprotic solvents, such as n-methyl pyrrolidone and dimethylformamide Polar protic solvents such as water, methanol, and/or ethanol may also have an increased tendency to cause removal of appended diamines.

Additionally or alternately, in some aspects the amount of diamine-appended MOFs in a 3D printed structure can be increased by using a post-printing vapor phase process to add diamines to MOFs with available sites for appending of a diamine After forming a structure using a polymeric structural material that incorporates a MOF as an adsorbent, the diamine can be appended by contacting the entire system in a diamine-containing solution. An example of a solution is 15 vol %-25 vol % of 2-aminomethylpiperidine in a solvent such as toluene. Other examples of diamines that can be appended in this manner include, but are not limited to, N,N'-dimethylethylenediamine, spermine, and triethylenetetramine. The solvent used for diamine appending can be a non-polar hydrocarbon and/or aromatic solvents (e.g., toluene, hexanes), but surprisingly methanol can also be used, in spite of the fact that methanol has a tendency to strip diamines from MOFs when methanol is part of an ink composition for 3D printing. Using methanol to append the amine can also work to remove solvent remaining in a structure formed from a 3D printing process.

Example 1—Ink Compositions and 3D Printed Filaments (PIM-1)

Series of ink compositions were made using two different types of MOF materials that have selectivity for $CO_2$ adsorption. A first series of compositions was made using a MOF corresponding to HKUST-1. To prepare well-dispersed printing ink compositions containing HKUST-1, the MOF was first dispersed in solvent mixtures and sonicated for 1 hour. Tetrahydrofuran (THF, ACS grade, Alfa Aesar) was selected as the solvent, and dimethylacetamide (DMAc, ACS grade, Alfa Aesar) was selected as nonsolvent. Sonication could effectively inhibit the particle agglomeration. The MOF suspension was then transferred into a 3D printer ink cartridge. Dry PIM-1 fine powders were then added into the MOF suspension. The cartridge containing the mixture was sealed and put into a rotating oven at 80° C. for 12 hours to dissolve the polymer and create a homogeneous dispersion. After cooling, the ink was promptly used for solution-based additive manufacturing.

To test these suspension-type ink compositions, the ink compositions were 3D printed via SBAM into single filaments. The ink compositions containing HKUST-1 were printed in the presence of an atmosphere containing the solvent (THF), to minimize evaporation until the ink was deposited on the substrate during printing of the single filaments. Evaporation of the solvent was then allowed to occur, resulting in formation of wet polymer structures, with intermixed portions of solvent/non-solvent. After 3D printing, the wet composites were vacuum dried at 100° C. for 12 hours to remove the remaining portions of the solvent and non-solvent.

Table 2 shows the ink compositions that were used to print various filaments. For comparison, some control filaments were also printed. In Table 2, the first row corresponds to a control filament of only PIM-1, while the second row corresponds to values for the neat HKUST-1 particles. The third row corresponds to an ink composition using HKUST-1 nanoparticles that were suspended in a solution of PIM-1 in THF and DMAC. The weight ratio of HKUST-1 to PIM-1 in the final row was 4:1.

TABLE 2

HKUST-1 Ink Compositions

| | Ink Composition | | | | BET Surface Area ($m^2/g$) | Pore Volume by $N_2$ ($cm^3/g$) | Pore Volume by Hg ($cm^3/g$) |
|---|---|---|---|---|---|---|---|
| Sample | MOF (g) | PIM-1 (g) | THF (g) | DMAc (g) | | | |
| PIM-1 | — | 1 | — | — | 723 | 0.50 | — |
| HKUST-1 | 1 | — | — | — | 1650 | 0.71 | — |
| HKUST-PTD-A1 | 4 | 1 | 4.7 | 3.5 | 1208 | 0.53 | 2.01 |

After forming the dry filaments, the surface areas and porosities of the resulting dry samples were characterized via 77 K nitrogen physisorption. In addition to the values shown in Table 2, the physisorption isotherm curves are shown in FIG. 1. Additional pore volume values were also obtained using mercury porosimetry, as shown in Table 2.

The surface area and pore volume for the HKUST-1/PIM-1 sample were lower than the expected value. As shown in Table 2, HKUST-1 alone had a surface area of 1650 $m^2/g$. Based on a 4:1 ratio of HKUST-1 to polymer in the resulting polymer structure, the surface area would be expected to be roughly 1465 $m^2/g$. By contrast, the measured surface area was 1208 $m^2/g$. This is 18% lower than the expected surface area based on the ratio of HKUST-1 to PIM-1 in the resulting polymer structure. Similarly, the measured pore volume was lower than expected by roughly 20%.

Figure 2:
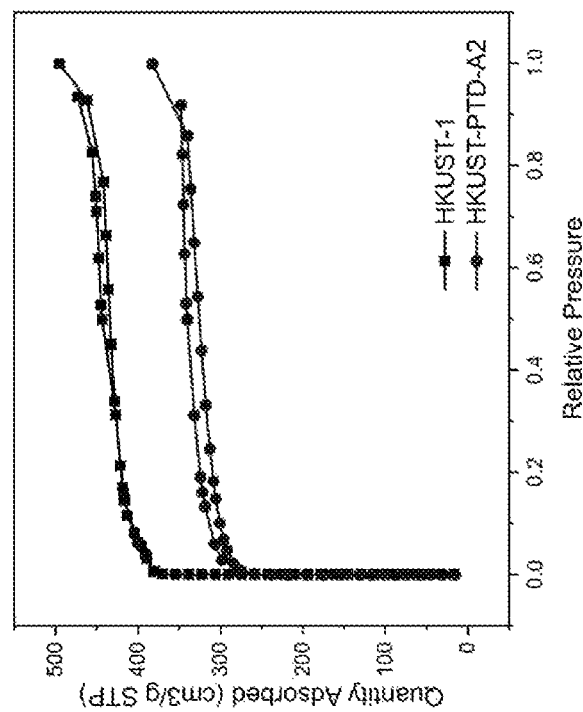
FIG. 2 shows the nitrogen physisorption isotherms of FIG. 1 with an expanded scale.

FIG. 1 and FIG. 2 shows the nitrogen physisorption isotherms that were collected during the characterization to obtain the surface area and pore volume of the various samples. FIG. 1 and FIG. 2 show isotherms for $N_2$ adsorption on HKUST-1 samples. As shown in FIG. 1 and FIG. 2, the adsorption per gram for the composite polymeric material of 80 wt % HKUST-1 and 20 wt % PIM-1 was about 80% of the adsorption per gram for the HKUST-1 material. Given that the polymeric material contains 80 wt % of the MOF, this demonstrates that the adsorption capacity of the adsorbent material is being substantially preserved. This maintenance of the adsorption capacity of the adsorbent material is in spite of the reduced surface area and pore volume for the adsorbent in the composite polymeric material. Conventionally, it would be expected that the adsorption per gram for the composite polymeric material would be reduced by 20% based on the amount of adsorbent in the composite material. Conventionally, another 15%-20% reduction in adsorption would be expected due to one or more of the following factors: a) the reduction in surface area and/or pore volume in the composite material; b) potentially poor pore interconnectivity (although this is mitigated when the 3D printed material is formed well); c) intercalation of the polymer into the pores of the adsorbent, filling the accessible pore volume; and/or d) coating, plugging, or otherwise blocking of the pore apertures, denying access to the otherwise unobstructed pore structure of the adsorbent. By contrast, only the reduction due to the amount of adsorbent in the composite material is apparently observed. It is noted that the polymer material would also have some baseline adsorption capacity, but due to the low weight percentage of polymer in the composite polymeric material, this would be expected to be a small contribution.

Example 2—Ink Compositions and 3D Printed Filaments (PES)

A second series of ink compositions were formed by forming a solution composed of roughly 20.6 wt % polyethersulfone (PES), 2.3 wt. % polyvinylpyrrolidone (PVP), 68.5% dimethylacetamide (DMAc), and 8.6% water (H2O). A series of solutions was formed so that the combined amount of EMM-67 and PES in the solution ranged from 25 wt. % to 75 wt. % of the weight of the solution. The following is an example of preparing an ink composition with a target weight of 10 g of polymer, solvent, nonsolvent, and pore former and 50 wt. % EMM-67 in the final structure. 2.06 g of EMM-67 was added to a mixture of 6.85 g of DMAc and 0.86 g of H2O. The mixture was sonicated for 12 hours in a sonication bath to disperse the EMM-67 particles. 2.06 g of PES and 0.23 g of PVP was then added to the mixture and placed in a glass vial on a heated roller (approx. 50° C.) where polymer dissolution occurred. Once the combined mixture (corresponding to the ink composition) was homogenous (between 1-3 days later), the ink composition was placed in a stainless-steel cartridge and printed on a modified Creality 3D printer.

A third series and fourth series of compositions were made using polyethersulfone as the polymer and a diamine-appended MOF known as EMM-44 as part of the ink composition. It is noted that for both the second series and third series of ink compositions, due to the nature of the ink formulation and subsequent printing process, at least a portion of the appended diamine was stripped from the EMM-44, so that at least a portion of the MOF incorporated into the resulting structural materials corresponded to EMM-67 rather than EMM-44.

For the third series of compositions, ink compositions were formed by first forming a solution composed of roughly 15 wt. % polyethersulfone (PES), 65.6 wt % dimethylacetamide, (DMAc), and 19.4 wt % lithium nitrate (LiNO$_3$). A series of solutions was then formed by adding EMM-44 so that solutions were formed where the combined amount of EMM-44 and PES in the solution ranged from 25 wt % to 75 wt % of the weight of the solution.

The following is an example of a procedure for forming a homogenous ink composition. In this example, the target end weight for the ink composition was to form an ink composition including 100 g of polymer, solvent, and structure forming component (in the form of LiNO$_3$, a pore forming component), although any other convenient amount of an ink composition could be formed. The weight of EMM-44 in the ink composition corresponded to weight in addition to the 100 g of polymer, solvent, and structure forming component. In this example, the target was to make an ink composition containing roughly 25 wt % of EMM-44.

To form the ink composition (with roughly 100 g of polymer, solvent, and structure forming component), an initial mixture corresponding to 20 wt % of the solvent, non-solvent, and polymer was prepared. In this example, this initial mixture corresponded to 3 g PES, 14.7 g DMAc, and 4.7 g LiNO$_3$. The initial mixture was placed in a glass jar on a heated roller (roughly 50° C.) until the solution was homogenous (between 1-4 days). A dispersion solution was then prepared by mixing the remaining 80 wt % of the LiNO$_3$ and DMAc. This corresponded to 56.2 g DMAc and 18.8 g LiNO$_3$. An additional portion of DMAc was added in this step to account for the solvent that will enter the EMM-44 pores. Shear mixing and sonication were alternated until the LiNO$_3$ was dissolved in the DMAc. EMM-44 was then added; shear mixing and sonication were again alternated until the EMM-44 particles were dispersed. The initial mixture was then added to the solution to form a combined mixture, along with the remaining portion of the polymer, and shear mixing with heat (roughly 60° C.) for 6 hours was used to start the dissolution of the polymer. The combined mixture was then placed in a glass jar on a heated roller (approx. 50° C.) where the remaining polymer dissolution occurred. Once the combined mixture (corresponding to the ink composition) was homogenous (between 1-3 days later), the ink composition was placed in a stainless-steel cartridge and heated (approx. 60° C.) to degas the dope prior to printing on a modified Creality 3D printer. It is noted that the ink compositions were printed without a solvent atmosphere.

Ink compositions including various combined weights of PES and EMM-44 (ranging from roughly 25 wt % to 75 wt %, relative to a weight of the ink composition) were prepared using a similar procedure. The ink compositions were then used to form structures by 3D printing. For at least some of the structures, the method for performing the 3D printing included forming the 3D printed structure on a heated bed to facilitate evaporation of solvent. After forming a structure by 3D printing, a post-printing procedure was used to remove at least a portion of the LiNO$_3$ from the resulting structure. In this example, post-printing removal of LiNO$_3$ was performed by soaking the resulting structure in water for 3 days. The water was changed once per day. After the third day, the structure was then soaked in methanol for 1 hour. The methanol was changed every 20 minutes.

The fourth series of ink compositions were also formed using PES and EMM-44. However, a different solvent and different structure forming component were used. Due in part to these differences, the resulting 3D printed structures had relatively low surface areas. Thus, while 3D printed structures were successfully formed from inks according to this third series of ink compositions, the resulting 3D printed structures had less favorable properties for use in applications related to adsorption of components from a process fluid. This corresponded to having a BET surface area of less than 30 m$^2$/g, or less than 10 m$^2$/g, such as down to 0.1 m$^2$/g or possibly still lower.

For the fourth series of ink compositions, the ink compositions included EMM-44 as an adsorbent, PES as a polymer, n-methyl pyrrolidone (NMP) as a solvent, and methanol (MeOH) as a non-solvent. As an example of preparing an ink composition, 6 g of EMM-44 were added in a mixture of NMP (120 g) and MeOH (30 g), followed by sonication for ~4 hours to ensure dispersion of the EMM-44 particles. Then 60 g PES were dissolved in the resulted EMM-44/NMP/MeOH solution and left on a roller overnight. Another 25 g PES was added gradually over the course of 3 days. The resulting ink composition was transferred into a stainless tube for installing on a modified Creality 3D printer. The ink compositions were printed without a solvent atmosphere. It is noted that due to the presence of methanol in the ink composition, the appended diamines of the EMM-44 may have been removed, so that at least a portion of the MOF particles in the ink composition may have been converted to Mg-MOF-274.

Additional Embodiments

Embodiment 1. An ink composition for solvent based additive manufacturing, comprising: 2.0 wt % or more of an adsorbent material relative to a weight of an ink composition; 35 wt % or less of a polymer; a solvent for the polymer; and a structure forming component, a ratio of the weight of the polymer to a combined weight of the solvent and the non-solvent being 0.7 or less.

Embodiment 2. The ink composition of Embodiment 1, wherein i) the ink composition comprises 10 wt % or more of the adsorbent material, ii) a ratio of the weight of the adsorbent to a weight of the polymer is 1.0 or more, iii) the ink composition comprises 15 wt % or less of the polymer, iv) the ratio of the weight of the polymer to the combined weight of the solvent and the structure forming component is 0.20 or less, v) a combination of two or more of i)-iv), or vi) a combination of three or more of i)-iv).

Embodiment 3. The ink composition of any of the above embodiments, wherein the structure forming component comprises a non-solvent, a ratio of the weight of the polymer to a weight of the non-solvent is 0.80 or less; or wherein the structure forming component comprises a pore forming component; or a combination thereof.

Embodiment 4. The ink composition of any of the above embodiments, wherein the ink composition is substantially free of water.

Embodiment 5. The ink composition of any of the above embodiments, wherein the ink composition comprises a suspension of particles of the adsorbent material in a solution comprising the polymer, the solvent, and the structure forming component.

Embodiment 6. The ink composition of any of the above embodiments, wherein the ratio of the weight of the adsorbent material to the polymer is 2.0 or more, or wherein the ink composition comprises 20 wt % or more of the adsorbent material, or a combination thereof.

Embodiment 7. The ink composition of any of the above embodiments, wherein the adsorbent material comprises a metal organic framework material, a zeotype framework material, activated charcoal, a covalent organic framework, a porous aromatic framework, a porous organic polymer, or a combination thereof, the adsorbent material optionally comprising an adsorbent with selectivity for $CO_2$ adsorption.

Embodiment 8. The ink composition of any of the above embodiments, wherein the adsorbent material comprises MOF-274, HKUST-1, EMM-67, EMM-44, or a combination thereof.

Embodiment 9. The ink composition of any of the above embodiments, wherein the polymer comprises a polymer of intrinsic microporosity, cellulose acetate, polyether sulfone, or a combination thereof.

Embodiment 10. A method for forming a 3D printed polymer structure, comprising: printing an ink composition according to any of Embodiments 1-9; and evaporating a portion of the solvent to form a continuous polymer structure.

Embodiment 11. The method of Embodiment 10, wherein the continuous polymer structure comprises a surface area of 50 $m^2/g$ or more, or wherein the continuous polymer structure comprises a pore volume as determined by nitrogen physisorption of 0.50 $cm^3/g$ or more, or a combination thereof.

Embodiment 12. The method of Embodiment 10 or 11, wherein a surface area of the continuous polymer structure is lower than a weighted average of a surface area of the adsorbent material and a surface area of the polymer by 10% or more.

Embodiment 13. A continuous polymer structure formed by 3D printing of an ink composition according to the method of any of Embodiments 10 to 12.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. An ink composition for solvent based additive manufacturing, comprising:
   2.0 wt % or more of an adsorbent material relative to a weight of an ink composition;
   between 12 wt % and 35 wt % of a polymer;
   a solvent for the polymer; and
   a structure forming component comprising a non-solvent, a ratio of the weight of the polymer to the weight of the non-solvent being 0.80 or less, and a ratio of the weight of the polymer to a combined weight of the solvent and the structure forming component being 0.7 or less.

2. The ink composition of claim 1, wherein the ink composition comprises 30 wt % or more of the adsorbent material.

3. The ink composition of claim 2, wherein a ratio of the weight of the adsorbent material to the weight of the polymer is between 0.3 to 6.0.

4. The ink composition of claim 1, wherein the ink composition comprises between 7 wt % and 15 wt % of the polymer.

5. The ink composition of claim 1, wherein the ratio of the weight of the polymer to the combined weight of the solvent and the structure forming component is 0.20 or less.

6. The ink composition of claim 1, wherein the structure forming component comprises a pore forming component.

7. The ink composition of claim 1, wherein the ink composition is substantially free of water.

8. The ink composition of claim 1, wherein the ink composition comprises a suspension of particles of the adsorbent material in a solution comprising the polymer, the solvent, and the structure forming component.

9. The ink composition of claim 1, wherein the ratio of the weight of the adsorbent material to the polymer is 2.0 or more.

10. The ink composition of claim 1, wherein a combined weight of the adsorbent material and the polymer is 30 wt % or more of the ink composition.

11. The ink composition of claim 1, wherein the adsorbent material comprises a metal organic framework material, a zeotype framework material, activated charcoal, a covalent organic framework, a porous aromatic framework, a porous organic polymer, or a combination thereof.

12. The ink composition of claim 1, wherein the adsorbent material comprises MOF-274, HKUST-1, EMM-67, EMM-44, or a combination thereof.

13. The ink composition of claim 1, wherein the adsorbent material comprises an adsorbent with selectivity for $CO_2$ adsorption.

14. The ink composition of claim 1, wherein the polymer comprises a polymer of polyether sulfone.

15. A method for forming a 3D printed polymer structure, comprising:
   printing an ink composition, the ink composition comprising:
      2.0 wt % or more of an adsorbent material relative to a weight of an ink composition;
      between 12 wt % and 35 wt % of a polymer;
      a solvent for the polymer; and
      a structure forming component comprising a non-solvent, a ratio of the weight of the polymer to the weight of the non-solvent being 0.80 or less, and a ratio of the weight of the polymer to a combined weight of the solvent and the structure forming component being 0.7 or less; and
   evaporating a portion of the solvent to form a continuous polymer structure.

16. The method of claim 15, wherein the ink composition comprises:
   10 wt % or more of the adsorbent material relative to a weight of an ink composition;
   15 wt % or less of the polymer, a ratio of the weight of the adsorbent material to the polymer being 1.0 or more;
   the solvent for the polymer; and
   the structure forming component for the polymer, a ratio of the weight of the polymer to a combined weight of the solvent and the structure forming component being 0.20 or less.

17. The method of claim 15, wherein the continuous polymer structure comprises a surface area of 50 $m^2/g$ or more, or wherein the continuous polymer structure comprises a pore volume as determined by nitrogen physisorption of 0.50 $cm^3/g$ or more, or a combination thereof.

18. The method of claim 15, wherein a surface area of the continuous polymer structure is lower than a weighted average of a surface area of the adsorbent material and a surface area of the polymer by 10% or more.

19. The method of claim 15, wherein the adsorbent material comprises a metal organic framework material, a zeotype framework material, activated charcoal, a covalent organic framework, a porous aromatic framework, a porous organic polymer, or a combination thereof.

20. A continuous polymer structure formed by 3D printing of an ink composition, the ink composition comprising:
   2.0 wt % or more of an adsorbent material relative to a weight of an ink composition;
   between 12 wt % and 35 wt % of a polymer;
   a solvent for the polymer; and
   a structure forming component comprising a non-solvent, a ratio of the weight of the polymer to the weight of the non-solvent being 0.80 or less, and a ratio of the weight of the polymer to a combined weight of the solvent and the structure forming component being 0.7 or less.

21. The continuous polymer structure of claim 20, wherein the continuous polymer structure is formed by 3D printing of an ink composition comprising:
   10 wt % or more of the adsorbent material relative to a weight of an ink composition;
   15 wt % or less of the polymer, a ratio of the weight of the adsorbent material to the polymer being 1.0 or more;
   the solvent for the polymer; and
   the structure forming component, a ratio of the weight of the polymer to a combined weight of the solvent and the structure forming component being 0.20 or less.

22. The continuous polymer structure of claim 20, wherein a ratio of a weight of the adsorbent material to a weight of the polymer is 1.0 or more.

23. The continuous polymer structure of claim 20, wherein the continuous polymer structure comprises a surface area of 50 $m^2/g$ or more, or wherein the continuous polymer structure comprises a pore volume as determined by nitrogen physisorption of 0.50 $cm^3/g$ or more, or a combination thereof.

24. The continuous polymer structure of claim 20, wherein a surface area of the continuous polymer structure is lower than a weighted average of a surface area of the adsorbent material and a surface area of the polymer by 10% or more.

* * * * *